United States Patent [19]

Vyvial

[11] Patent Number: 4,718,679
[45] Date of Patent: Jan. 12, 1988

[54] LOCKDOWN RING ASSEMBLY FOR WELLHEAD SEAL

[75] Inventor: Larry A. Vyvial, Rosenberg, Tex.

[73] Assignee: Cooper Industries, Houston, Tex.

[21] Appl. No.: 3,679

[22] Filed: Jan. 15, 1987

[51] Int. Cl.[4] .......................... F16J 15/18; F16J 15/24
[52] U.S. Cl. .................................... 277/112; 277/120; 277/193; 277/198
[58] Field of Search ...................... 277/112, 116.2, 117, 277/119–122, 192, 193, 197, 198, 118

[56] References Cited

U.S. PATENT DOCUMENTS

| | | | |
|---|---|---|---|
| 1,973,809 | 9/1934 | Heggem | 277/112 X |
| 2,456,081 | 12/1948 | Penick | 277/198 X |
| 4,349,205 | 9/1982 | McGee et al. | 277/117 X |
| 4,384,726 | 5/1983 | Meyer | 277/112 X |
| 4,556,224 | 12/1985 | Le | 277/118 |

*Primary Examiner*—Robert S. Ward
*Attorney, Agent, or Firm*—E. E. Scott; R. L. Maxwell

[57] ABSTRACT

A lockdown loading ring mechanism for a dual crossover seal in a pressurized wellhead which comprises a segmented loading ring assembly 60 of a plurality of arcuate segments 60a arranged in circular fashion within the wellhead annulus between the dual sealing devices of a dual crossover seal assembly 40. The ends of adjacent segments are spaced to allow for contraction and expansion of the assembly. Each segment is actuated by at least one holddown screw 66 of a plurality of holddown screws disposed in radial array about the wellhead axis in equiangular spacing and an equal number of holddown screws are employed to actuate each segment. The nose ends 70 of the holddown screws are in abutting engagement with the outer surfaces 63 of the ring segments whereby actuation of the holddown screws drives the ring segments radially inward to where upward and downward facing frustoconical annular surfaces 62, 61 of the loading ring segments engage cooperative camming surfaces 83a, 51a of the energizer rings 83, 51 of the upper and lower sealing devices respectively, and simultaneously apply balanced axially compressive forces to the dual sealing devices to effect their energization and sealing of the wellhead annulus.

5 Claims, 4 Drawing Figures

LOCKDOWN RING ASSEMBLY FOR WELLHEAD SEAL

BACKGROUND OF THE INVENTION

This invention relates generally to holddown lock screw assemblies as are commonly used in pressurized wellhead structures for such functions as energizing a wellhead seal and more particularly to a holddown lock screw assembly for energizing a dual crossover seal assembly where balanced energizing loads are required.

Holddown screws are used in many applications to provide a preload for energizing wellhead seals. Typically, the nose end of each of a plurality of screws enegages a camming surface of the seal device to apply an energizing force in either the upward or downward direction depending upon the particular type of seal device. The nose end of the holddown screw is customarily of conical configuration and is adapted to engage a frusto-conical camming surface of the seal device to be energized. On occasion, a holddown screw is used to simultaneously apply an energizing force in both the upward and downward directions as when applying a preload to the dual sealing devices of a dual crossover seal assembly. Such an installation is shown in U.S. Pat. No. 4,556,224.

A crossover seal is a packing mechanism designed to be used in the lower flanges of a casing head and/or tubing head to provide a seal between those heads and the portion of casing extending therein which is being suspended in the head below. A crossover seal enables the head in which it is installed to be rated to the next higher pressure rating above that of the lower flange, provided that the upper flange, and outlets of that head are of the same higher pressure rating. Dual crossover seal assemblies are oftentimes provided for the sake of redundancy and safety. However, when disposed in tandem array as shown in U.S. Pat. No. 4,556,224, FIG. 2 thereof, it is extremely difficult to obtain a balanced loading of both seal assemblies because of manufacturing tolerances for the various parts of the seal assemblies and the holddown screws. Accordingly, testing of such dual assemblies is unreliable and true redundancy and safety is not achieved. Also, while it is known to provide a holddown screw with a separately mounted nose piece, as shown in U.S. patent application, Ser. No. 06/845,912, entitled HOLDDOWN SCREW and filed Mar. 31, 1986, the purpose of such a nose piece is to reduce or minimize galling between the contacting surfaces of the holddown screw and seal assembly and it is incapable of adjusting for tolerance error stock-ups to apply balance loading to a dual crossover seal assembly.

Accordingly, it is therefore an object of the invention to provide a loading mechanism which can be actuated by screws to apply a balanced preload to both sealing devices of a dual crossover seal assembly.

It is another object to provide a segmented loading ring assembly which can be actuated by holddown screws to apply a balanced preload substantially uniformly about the circumference of the annular sealing devices of a dual crossover seal assembly in a pressurized wellhead.

SUMMARY OF THE INVENTION

The invention is a loading mechanism which can be actuated by conventional holddown screws to simultaneously apply a balanced preload to both sealing devices of a dual crossover seal assembly in an annulus of a pressurized wellhead. The mechanism comprises a segmented loading ring assembly of a plurality of arcuate segments arranged in circular fashion within the wellhead annulus between the dual sealing devices of the dual crossover seal assembly with spacing between the segment ends to allow for contraction and expansion of the assembly. Each segment is actuated by at least one holddown screw of a plurality of holddown screws disposed in a radial array about the wellhead axis in equiangular spacing and an equal number of holddown screws are employed to actuate each segment. The nose ends of the holddown screws are disposed in abutting engagement with outer cylindrical surfaces of the locking ring segments whereby actuation of the holddown screws drives the ring segments radially inward to where upward and downward facing frustoconical annular surfaces of the loading ring segments engage cooperative camming surfaces on energizer rings of the upper and lower sealing devices respectively, and simultaneously apply balanced axially compressive forces to the dual sealing devices to effect their energization and effective sealing of the wellhead annulus.

BRIEF DESCRIPTION OF THE DRAWINGS

In the accompanying drawings which form part of the specification and are to be read in conjunction therewith.

DETAILED DESCRIPTION OF THE PREFERRED EMBODIMENT

Figure 1:
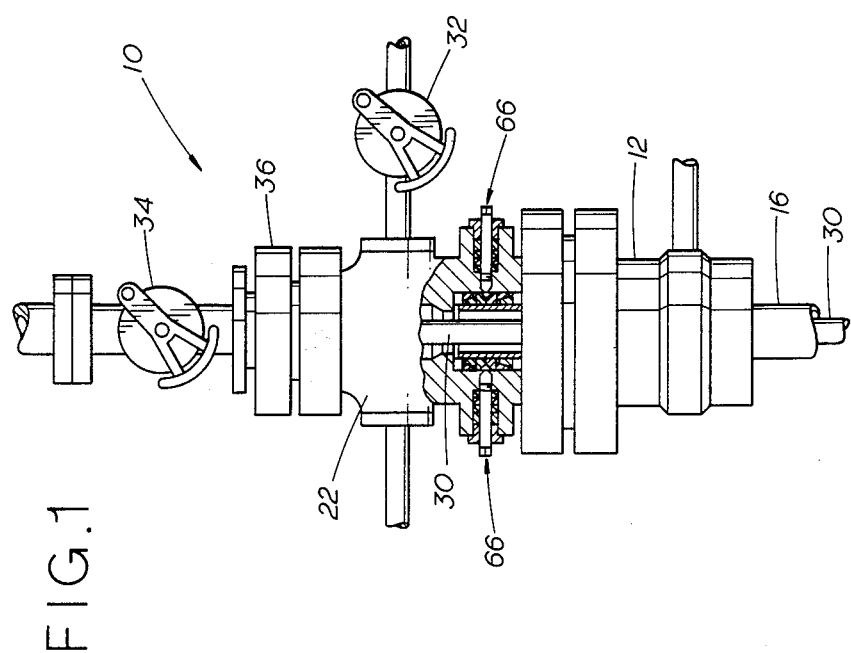
FIG. 1 is a vertical sectional view of the lower end of a wellhead and christmas tree assembly which incorporates a unique loading ring assembly in accordance with the invention.

Referring now to the drawings in greater detail and more particularly to FIG. 1, a wellhead and christmas tree assembly 10 is shown which includes a casing head 12 adapted to be secured to the top end of a surface casing (not shown) in coaxial relation thereto. A well casing string 16 is suspended from the casing head 12 by means of a slip assembly (not shown) which is mounted within the casing head.

An adapter flange 20 is shown mounted on top of the casing head 12 by bolts or other means (not shown) and a tubing head 22 is mounted atop the adapter flange 20 such that mating flanges of the adapter flange 20 and tubing head may be secured by bolts 24. A tubing string 30 is suspended form a tubing hanger in the tubing head 22 and extends coaxially within the casing 16. A valve 32 mounted to a side outlet on the tubing head is adapted to control the flow of fluid from the annular space between the tubing 30 and the well casing 16.

A lower master valve 34, mounted atop a second adapter flange 36 secured atop the tubing head 22, controls flow from the tubing 30. An upper master valve and the remainder of a conventional christmas tree (not shown) are then mounted above the valve 30.

A dual crossover seal assembly 40 is provided in the wellhead for sealing between the tubing head 22 and the upper end portion of the well casing 16 which extends upwards into the central bore 46 of the tubing head. The purpose of the crossover seal is to isolate the high pressure fluids existing within the tubing head 22 between the well casing 16 and the central bore 46. In this manner, the portions of the wellhead below the tubing head 22 may be rated at lower pressure ratings thereby achieving substantial cost savings for the well operator.

Figure 2:
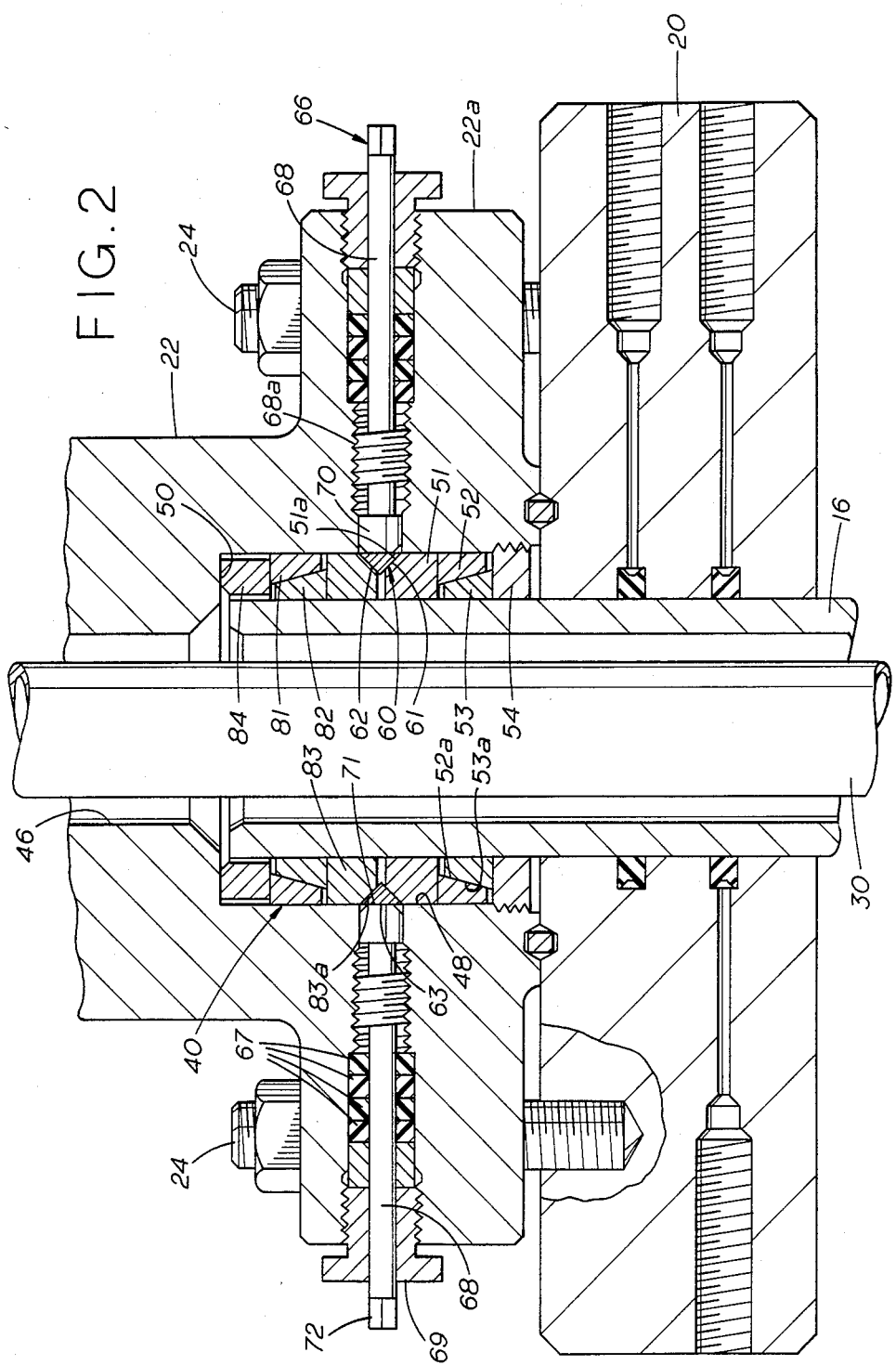
FIG. 2 is an enlarged section of the wellhead showing a dual crossover seal assembly installed between a tubing head and well casing with both of the seal assemblies being energized and preloaded by the screw actuated loading ring assembly of the invention.

Referring more particularly to FIG. 2, wherein the present invention is illustrated in enlarged radial cross section, the dual crossover seal assembly 40 is shown in pre-loaded energized condition for sealing between the casing 16 and the tubing head 22. The central bore 46 of the tubing head includes an enlarged diameter portion extending to the lower end of the tubing head and defined by the cylindrical bore surface 48 which is bounded at its upper end by the downward facing annular shoulder 50.

The dual crossover seal assembly 40 utilizes two sets of metal seal rings, each set constituting a crossover seal assembly. The lower crossover seal assembly includes an energizer ring 51 which is positioned atop an outer metal seal ring 52 disposed in contiguous relation with an inner metal seal ring 53, which, in turn, is seated atop a retainer ring 54 threaded into the lower end of the bore 48. The outer seal ring 52 includes an inner annular surface 52a of frusto-conical downward facing configuration which is disposed in abutting relation with the upward facing frusto-conical outer surface 53a of the inner seal ring 53.

The energizer ring 51 is provided on its upper end with an upward and outward facing camming surface 51a which is disposed in contiguous abutting relation with a conforming frusto-conical inward and downward facing camming surface 61 of a segmented loading ring 60.

The loading ring assembly 60, whose operation will be later described in greater detail, is made up of a plurality of arcuate segments 60a arranged in a circle, each segment of which in addition to a camming surface 61 includes an inner and upward facing frustoconical camming surface 62 and an outer cylindrical surface 63.

Figure 3:
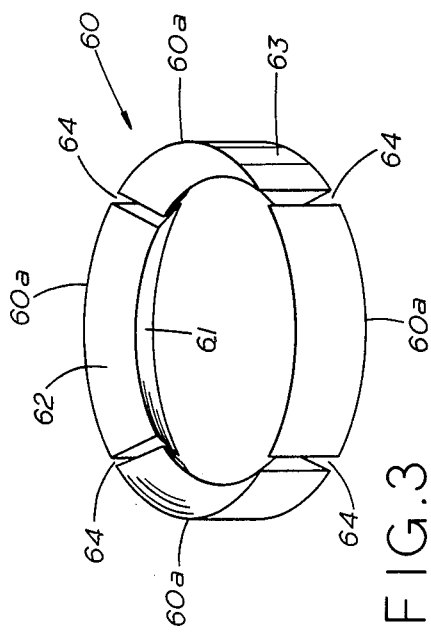
FIG. 3 is a view in perspective of one form of segmented loading ring which may be used in the invention.

The segmented ring 60, shown in perspective view in FIG. 3, is adapted to be forced radially inwardly with respect to the longitudinal axis of the wellhead by the nose ends 70 of conventional holddown screws 66, two of which are shown in FIG. 2. While only a pair of holddown screws 66 are illustrated, it is to be understood that a plurality of such screws are normally employed and are arranged in a radial array in surrounding relation to the casing 16. Such holddown screws typically include a plurality of annular packing elements 67 sleeved about the shank 68 of the holddown screw, a packing gland nut 69 for energizing the packing elements, and a contact nose 70 preferably provided with a blunt end 71 for engaging the outermost cylindrical surface 63 of the segmented ring assembly 60.

As is well known, the holddown screw 66 provided with a threaded shank portion 68a may be inwardly through a screw-receiving bore in the radial flange 22a at the lower end of tubing head 22 by applying a tool to flat surfaces provided on the outer end portion 72 of the screw shank 68.

As the screw 66 is threaded inwardly, its blunt end surface 71 drives a ring segment of the ring assembly 60 inwardly towards the axis of the wellhead and accordingly, applies a camming force to the camming surface 51a of the energizer ring 51 of the lower set of crossover seal rings 52, 53, which axially compresses the seal rings 52, 53 between the energizer ring 51 and retainer ring 54. As described in U.S. Pat. No. 4,556,224 the axial compression of the seal rings 52, 53 causes these rings to wedge more tightly with respect to one another and urges their radial expansion to effect reliable, high pressure, high temperature metal-to-metal seals with the surface of casing 16 and the cylindrical bore surface 48 in the tubing head 22.

While the energization of the lower set of metal seal rings 52, 53 has been described, it is to be understood that the actuation of the holddown screws 66 also acts to energize the upper seal rings of the dual crossover seal assembly 40. The upper portion of the dual crossover seal assembly 40 comprises an upper set of metal seal rings 81, 82 which are sandwiched between an energizer ring 83 and an adapter ring 84 which abuts the shoulder 50 in the tubing head bore.

The energization of the upper set of metal seal rings 81, 82 is substantially identical to that of the lower metal seal rings 52, 53. As a holddown screw 66 is threaded inwardly and drives a segment of the loading ring 60 inwardly, the upward facing surface 62 of the ring segment is urged against a downward facing frusto-concial camming surface 83a provided on the lower outer corner of the energizer ring 83 which applies an axially compressive force to the set of metal seal rings 81, 82. The axial compression of the seal rings 81, 82 results in their being more tightly wedged and causing their radial expansion to effect metal-to-metal seals with the casing 16 and tubing head bore. The two sets of metal seal rings 52, 53 and 81, 82 are thus energized simultaneously and provide redundancy in the crossover seal assembly and enhanced safety.

Figure 4:
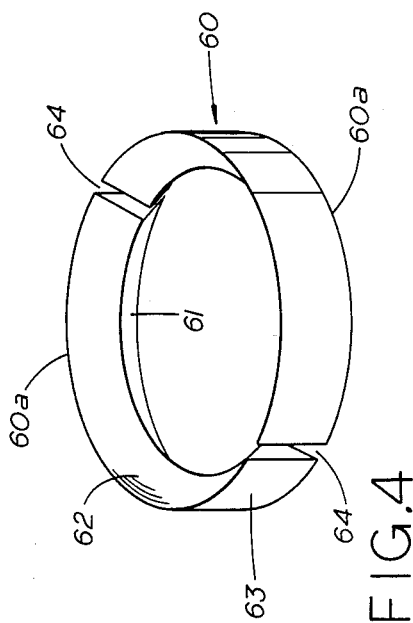
FIG. 4 is a view in perspective of another form of loading ring which may be used in the invention.

While conventional holddown screws have been used with dual crossover seals in a wellhead to apply energizing forces simultaneously in both the upper and lower directions, it has been practically impossible to apply a balanced preload to the upper and lower seal assemblies because of the accumulation of tolerance errors in the manufacture and assembly of the various parts. With the present invention, the freedom of movement of a segment of the loading ring 60 to move in the vertical direction as well as radially with respect to the wellhead axis, results in an equal and balanced distribution of forces from the loading ring 60 to the upper and lower energizer rings 83 and 51, respectively. The loading ring assembly 60 is segmented in a number of parts such as four parts as shown in FIG. 3 or two parts as in FIG. 4. As normally installed, there are gaps 64 between the ends of the ring segments as they are circularly arranged and these gaps permit a limited degree of radial movement of the segments to contract or expand as may be necessary. It is desirable that the number of segments in the loading ring assembly 60 is such that each is adapted to be engaged by an equal number of holddown screws 66, and at least one screw 66. With allowances for the gaps 64, the arcuate extent of the segments should be sufficient that in total, their inner arcuate surfaces are substantially equal to the circumference of an energizer ring. In this manner, there is uniformity in the application of forces by the holddown screws to the various ring segments, and as the segments are relatively mobile, there is uniformity in the application of forces from the ring segments to the energizer rings 83 and 51, respectively, throughout their arcuate extent. Each ring segment is free to adjust its position to compensate for variations in the accumulated manufacturing tolerances of the upper and lower seal assemblies as well as those present in the holddown screws themselves.

It is also to be understood that the foregoing description of a preferred embodiment of the invention has been presented for purposes of illustration and description and is not intended to limit the invention to the precise form disclosed. For example, while the invention has been described with a seal assembly which uses metal sealing elements, it could as well use elastomer or plastic or other type sealing elements. The number of loading ring segments might also be other than two or four but should always be two or more. It is to be appreciated therefore, that changes may be made by those skilled in the art without departing from the spirit of the invention.

What is claimed is:

1. A mechanism for simultaneously applying balanced loading forces to the dual sealing devices of a dual crossover seal assembly installed in vertical tandem array in an annulus between concentric inner and outer cylindrical surfaces within a pressurized wellhead, said sealing devices each including sealing elements for effecting a seal between the concentric cylindrical surfaces and having an energizer ring with an annular camming surface adapted to receive an energizing force for compressing and energizing the sealing elements, said mechanism comprising:

a loading ring assembly of a plurality of arcuate ring segments arranged in circular fashion within the wellhead annulus between the dual sealing devices of the dual crossover seal assembly with the ends of the arcuate ring segments in spaced relation to allow for radial expansion and contraction of the ring assembly, each said ring segment having a downward facing camming surface in cooperative engagement with the camming surface on the energizer ring of the lower sealing devices and having an upward facing camming surface in cooperative engagement with the camming surface on the energizer ring of the upper sealing device, and an outer circumferential surface adapted to be engaged by the nose end of a holddown screw;

a plurality of holddown screws installed in the wellhead in radial array about the longitudinal axis of the wellhead with equiangular spacing of the holddown screws, each adapted for axial movement toward the wellhead axis and having a contact nose in abutting engagement with the outer circumferential surface of a ring segment, whereby actuation of the holddown screws drives the ring segments in radial inward direction to thereby cam the energizer rings of the upper and lower sealing devices in an axial direction for simultaneously applying balanced axially compressive forces to the sealing devices to effect their energization and effective sealing of the wellhead annulus.

2. A mechanism as set forth in claim 1 wherein the sealing elements of each sealing device of the dual crossover seal assembly comprise a pair of metal seal rings disposed in concentric relation with an inner annular frusto-conical surface of one ring in wedging engagement with an outer annular frusto-conical surface of the other ring whereby an axial compression of the sealing elements induces their radial expansion to effectively seal the annulus.

3. A mechanism as set forth in claim 1 wherein the camming surfaces of said energizer rings are frusto-conical surfaces.

4. A mechanism as set forth in claim 1 wherein each of said arcuate ring segments is engaged by an identical number of holddown screws.

5. A mechanism as set forth in claim 1 wherein said arcuate ring segments are of equal arcuate lengths and equal radius of curvature.

* * * * *